April 7, 1959 W. C. BROWN 2,881,270

REGENERATIVE AMPLIFIERS

Filed Jan. 8, 1958 2 Sheets-Sheet 1

INVENTOR
WILLIAM C. BROWN

BY Elmer J. Gorn

ATTORNEY

April 7, 1959 W. C. BROWN 2,881,270

REGENERATIVE AMPLIFIERS

Filed Jan. 8, 1958 2 Sheets-Sheet 2

INVENTOR
WILLIAM C. BROWN
BY Elmer J. Gorn
ATTORNEY

United States Patent Office 2,881,270 Patented Apr. 7, 1959

2,881,270

REGENERATIVE AMPLIFIERS

William C. Brown, Weston, Mass., assignor to Raytheon Manufacturing Company, Waltham, Mass., a corporation of Delaware Application January 8, 1958, Serial No. 707,809

5 Claims. (Cl. 179—171)

This invention relates to regenerative amplifiers and more particularly to magnetron amplifiers operated with positive feedback.

Magnetron amplifiers arranged to pass a continuous beam of electrons past a series of cavities formed in the anode about the cathode with their ends isolated arranged to amplify radio frequency energy introduced at one end of the line and extracted at the other have been described in an article entitled "Platinitron Increases Search Radar Range" by the applicant in "Electronics" for August 1, 1957, beginning at page 164. Considerable power gain can be obtained with such amplifiers over a broad band of frequencies with considerable efficiency. By the use of the construction of this invention it has been found possible to increase efficiency and power gain at the expense of band width. This has been accomplished by introducing positive feedback, preferably by inserting mismatches in the input and output transmission lines at such distances from the input and output of the internal delay line or anode that radio frequency energy will be reflected from the mismatch in the output line and returned to the mismatch in the input line where it is again reflected to arrive at the input to the internal delay line in such phase as to be added to the input energy in phase. This reflection and rereflection is repeated until saturation is reached. Maximum efficiency and power gain can be obtained over a band width of ½ of 1 percent of the operating frequency.

Other and further advantages of this invention will be apparent as the description thereof progresses, reference being had to the accompanying drawings wherein.

Figure 1:
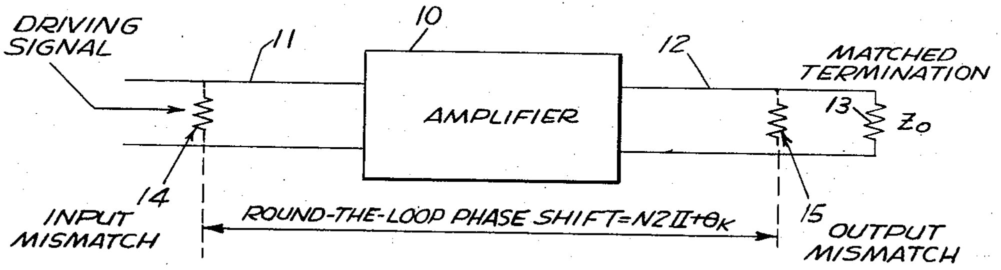
Fig. 1 is a highly schematic diagram of the regenerative amplifier of the invention.

In Fig. 1 the reference numeral 10 designates the amplifier of the invention, preferably of the magnetron type, having an input transmission line 11 and output transmission line 12 terminated by a load 13. There is a mismatch or discontinuity in the input line represented by the dotted line 14 and another mismatch in the output line represented by the dotted line 15.

Figure 2:
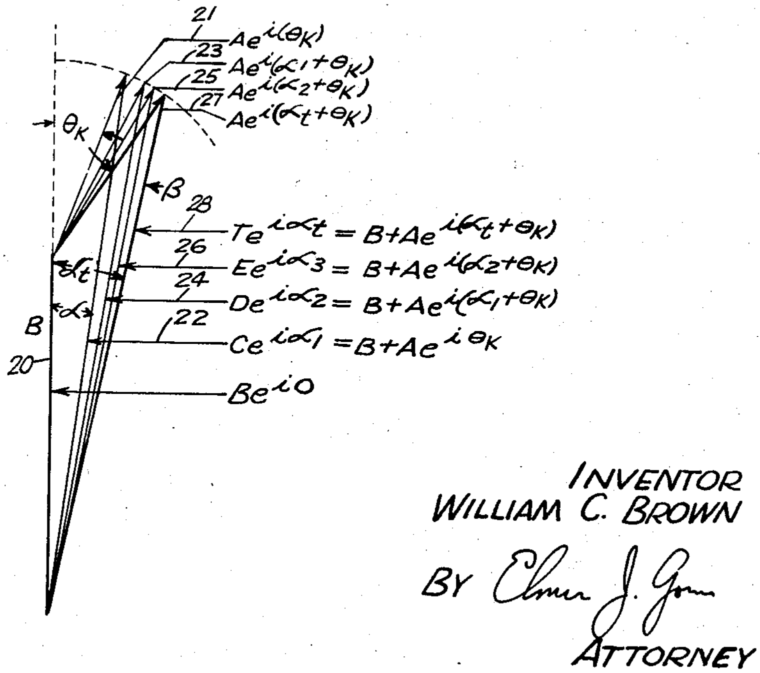
Fig. 2 is a vector diagram illustrating the operation of the invention.

The driving signal represented by the arrow 16 in Fig. 1 applied through the line 11 to the amplifier 10 is represented by the vector 20 in Fig. 2 and has an amplitude B and reference phase $\theta$ after passage through the amplifier 10 where it is amplified. The driving signal is reflected by the mismatch 15 back through the amplifier 10 and reflected again from the mismatch 14. This reflected signal is represented by the vector 21 of amplitude A and phase $\theta_K$.

$$A=r_1r_2g_1B \qquad (1)$$

where $r_1$ = the reflection factor at the output mismatch, $r_2$ = the reflection factor at the input mismatch.

These reflection factors are related to the characteristic impedance, $Z_0$, of the output line 11 and to the impedance, $Z_1$, of the output mismatch section 15 as follows:

$$r_1=\frac{\frac{Z_0^2}{Z_1^2}-1}{\frac{Z_0^2}{Z_1^2}+1}=\frac{Z_0^2-Z_1^2}{Z_0^2+Z_1^2} \qquad (2)$$

$r_2$ is computed in a similar manner for the input mismatch.

$g_1$ is the gain of the tube.

The phase $$\theta_K=2\theta_p+2\theta_t+\theta_1+\theta_2-N2\pi \qquad (3)$$

wherein $2\theta_p$ is the phase shift caused by two passengers through the amplifier; $2\theta_t$ is the phase shift caused by two passages through the sections of transmission line between the mismatches. $\theta_1$ is the phase shift caused by the mismatch in the output and $\theta_2$ is the phase shift caused by the mismatch in the input. N is the nearest integer which will place $\theta_K$ in the range —— 180° $<\theta_K<+188$.

This signal combines vectorily with the input signal $Be^{i0}$ to produce a second input signal represented by the vector 22 of value C and phase $\alpha_1$. This signal is reflected twice to become $Ae^{i(\alpha_1+\theta_K)}$ represented by vector 23 and is vectorily added to the original input signal represented by vector 20 to produce a resultant signal $De^{i\alpha_2}$ represented by vector 24. This signal is reflected twice to become signal $Ae^{i(\alpha_2+\theta_K)}$ represented by vector 25 which when vectorily added to signal B produces resultant signal $Ee^{i\alpha_3}$ represented by vector 26. This process continues with continually decreasing phase shift until a reflection signal $Ae^{i(\alpha_t+\theta_K)}$ represented by vector 27 is produced and combined with the input signal to produce resultant signal $Te^{0\alpha_t}$ represented by vector 28.

Figure 3:
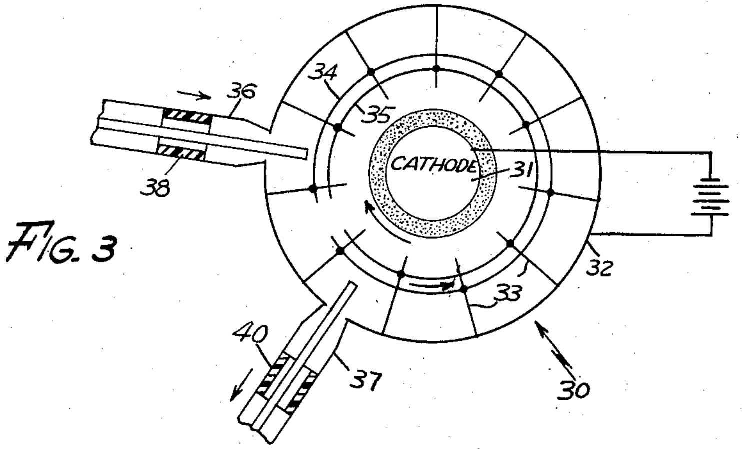
Fig. 3 is a schematic diagram of an embodiment of the invention.
Figure 4:
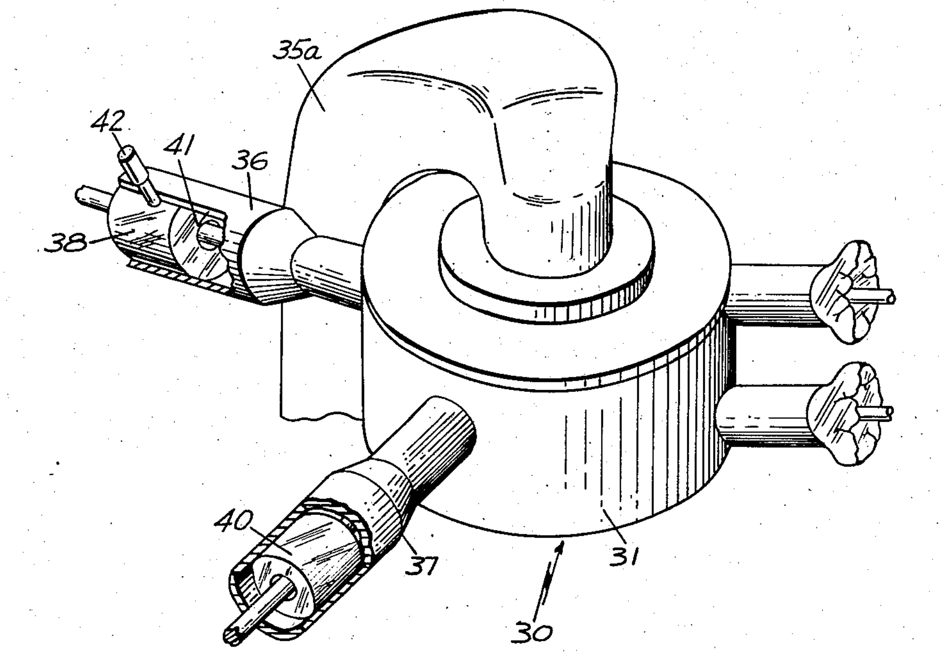
Fig. 4 is an isometric view of an amplifier of the invention.

A representative arrangement for obtaining these phase shifts and positive feedback is shown schematically in Figs. 3 and 4. A magnetron amplifier 30 is composed of a cathode 31 and anode 32 with vanes 33 forming resonant cavities, with alternate vanes joined by straps 34 and 35 with a magnetic field parallel to the axis of the cathode by means of a magnet 35, means for inserting and driving signal such as the coaxial cable 36 indicated and means for extracting the amplified energy such as the coaxial cable 37. Energy may be inserted and extracted from the anode line in the manner shown in my copending application No. 706,812, filed January 2, 1958. These cables each have a tubular insert 38 or 40 of dielectric material selected and dimensioned to present an impedance $Z_1$ or $Z_2$ different from the characteristic impedance of the coaxial line 36 or 37 to produce the reflection factors $r_1$ and $r_2$ according to Equation 1. The position of the mismatches 38 and 40 with respect to the magnetron 30 determines the phase shifts $\theta_t$ and the dimensions and characteristics of mismatches themselves determine the phase shifts $\theta_1$ and $\theta_2$. The phase difference B between the final rereflected signal and the resultant can be shown to be equal to $\theta_K$, the phase angle of first rereflected signal so that $$\sin \alpha_t=\frac{A}{B}\sin \theta_K \qquad (4)$$

However, for this to be true $\alpha+\theta_K$ must not exceed $\pi$.

In a representative case with an amplifier having a gain of 4 and the mismatch at the output and input producing a VSWR of 1.5 each and a $\theta_K$ of 90°, $$g_1r_1r_2=(4)(0.2)(0.2)=0.16$$

normalized to the input signal, $$\frac{A}{B}\sin\theta_K=0.16$$

and $\alpha_t=9.2°$. Even with a power gain of 100, $\alpha_t$ would need to be only 23.6°. With $\theta_K=\alpha_t$ and $\alpha_t=\sin\alpha_t$ $$K=1-\left(\frac{A}{A+B}\right)^{t_r} \quad (5)$$

where:

$K$=fraction of steady state $\alpha_t$ achieved in time $t_r$.
$t_r$=elapsed time normalized to the time required for a round trip between the input and output reflections.
$A$=magnitude of reflection vector.
$B$=magnitude of driving signal vector.

If vector $A=\frac{1}{2}B$ and $t_r=3$, $K=0.963$ and if $A=0.16B$ and $t_r=2$, $K=0.981$.

The device of the invention may be used as a regenerative amplifier by adjusting the distance between the input and output reflections by means of a slot 41 and handle 42 so that oscillation occurs without the presence of a driving signal at the same frequency as the initial value of the driver frequency, $f_0$. The frequency of the driving frequency may be changed while retaining the regenerative effect if the angle $\theta_K$ is changed according to the relationship $$\Delta\theta_K=\Delta f_d\frac{d\theta_K}{df} \quad (6)$$

where:

$\Delta\theta_K$=change in phase of reflected wave.
$\Delta f_d$=change in frequency of the driving signal.

If $$\frac{d\theta_K}{df}$$

is assumed to be independent of frequency and $\theta_K$ is assumed to be equal to zero when $\Delta f_d=0$, then $$\theta_K=\Delta f_d\frac{d\theta_K}{df} \quad (7)$$

Substituting this value of $\theta_K$ in Equation 4, $$\Delta f_d=\frac{df}{d\theta_K}\sin^{-1}\frac{|B|}{|A|}\sin\alpha_t$$

where $|B|$=driving signal vector magnitude.
$|A|$=rereflection signal vector magnitude.
$\alpha_t$=angle between the driving signal vector B and the input signal vector $A+B$ under steady state conditions.

This equation gives half the total frequency excursion available for a given $B/A$ ratio and value of $\alpha_t$ since $\alpha_t$ and therefore $\Delta f_d$ may be either positive or negative. The percentage bandwidths are $$\frac{200}{f_d}\left(\frac{df}{d\theta_K}\right)\sin^{-1}\left(\frac{B}{A}\sin\alpha_t\right) \quad (9)$$

The overall gain $g_2$ in terms of the gain $g_1$, the driving vector B and rereflection vector $Ae^{i(\alpha_t+\theta_K)}$. Maximum gain is obtained at the frequency when the driver signal and the self-oscillation frequency of the regenerative amplifier are the same so that $\theta_K$ and $\alpha_t$ become zero. Then the vectors $A+B$ are in the same direction and $$g_2=\frac{|R|}{|B|} \quad (10)$$

$$g_1=\frac{|R|}{|A|+|B|} \quad (11)$$

where:

$|R|$=magnitude of output signal.
$|B|$=magnitude of driver signal.
$|A|$=magnitude of rereflected signal.

Combining (10) and (11) gives $$g_2=g_1\frac{|A|+|B|}{|B|}$$

Gains in the order of 30 db can be obtained with bandwidths of the order of ½ percent.

The operating frequency of the system can be made to be mechanically tunable over a 10 percent range by any of the well-known methods if in addition the mechanism is provided for sliding one of the mismatches in the transmission line to vary the separation between mismatches.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein except as defined by the appended claims.

What is claimed is:

1. A regenerative amplifier comprising an electron discharge device having a cathode, an anode formed with a delay line terminated by mismatching impedances with ends isolated from each other, means to maintain the anode at a positive potential with respect to the cathode, means for producing a magnetic field in the space between the anode and the cathode in a direction parallel to the axis of the cathode to form a continuous electron beam about the cathode, means for introducing radio frequency energy at one end of the delay line and means for extracting this energy from the other end, the mismatched terminations of the line being disposed a distance apart such that radio frequency energy introduced at one end of the delay line, reflected from the output termination of the line and rereflected from the input end termination of the line will be in phase with the incoming energy.

2. A regenerative amplifier comprising an electron discharge device having a cathode, an anode formed with a delay line terminated by mismatching impedances with ends isolated from each other, means to maintain the anode at a positive potential with respect to the cathode, means for producing a magnetic field in the space between the anode and the cathode in a direction parallel to the axis of the cathode to form a continuous electron beam about the cathode, coaxial transmission line means for introducing radio frequency energy at one end of the delay line and coaxial transmission line means for extracting this energy from the other end, the mismatched terminations of the line being disposed a distance apart such that radio frequency energy introduced at one end of the delay line, reflected from the output termination of the line and rereflected from the input end termination of the line will be in phase with the incoming energy.

3. A regenerative amplifier comprising an electron discharge device having a cathode, an anode formed with a delay line terminated by mismatching impedances with ends isolated from each other, means to maintain the anode at a positive potential with respect to the cathode, means for producing a magnetic field in the space between the anode and the cathode in a direction parallel to the axis of the cathode to form a continuous electron beam about the cathode, means for introducing radio frequency energy at one end of the delay line and means for extracting this energy from the other end, the mismatched terminations of the line being formed as tubes of a material presenting a different impedance to the radio frequency energy than the characteristic impedance of the lines disposed a distance apart such that radio frequency energy introduced at one end of the delay line, reflected from the output termination of the line and rereflected from the input end termination of the line will be in phase with the incoming energy.

4. A regenerative amplifier comprising an electron discharge device having a cathode, an anode formed with a delay line terminated by mismatching impedances with ends isolated from each other, means to maintain the anode at a positive potential with respect to the cathode, means for producing a magnetic field in the space between the anode and the cathode in a direction parallel to the axis of the cathode to form a continuous electron beam about the cathode, coaxial transmission line means for introducing radio frequency energy at one end of the delay line and coaxial transmission line means for extracting this energy from the other end, the mismatched terminations of the line being formed as tubes of a material presenting a different impedance to the radio frequency energy than the characteristic impedance of the lines disposed a distance apart such that radio frequency energy introduced at one end of the delay line, reflected from the output termination of the line and rereflected from the input end termination of the line will be in phase with the incoming energy.

5. A regenerative amplifier comprising an electron discharge device having a cathode, an anode formed with a delay line terminated by mismatching impedances with ends isolated from each other, means to maintain the anode at a positive potential with respect to the cathode, means for producing a magnetic field in the space between the anode and the cathode in a direction parallel to the axis of the cathode to form a continuous electron beam about the cathode, means for introducing radio frequency energy at one end of the delay line and means for extracting this energy from the other end, the mismatched terminations of the line being formed as tubes of a material presenting a different impedance to the radio frequency energy than the characteristic impedance of the lines disposed a distance apart such that radio frequency energy introduced at one end of the delay line, reflected from the output termination of the line and rereflected from the input end termination of the line will be in phase with the incoming energy, means for mounting one said mismatch at a variable distance from the delay line.

No references cited.